United States Patent [19]

Corcoran

[11] 4,023,158
[45] May 10, 1977

[54] REAL THREE-DIMENSION VISUAL DISPLAY ARRANGEMENT

[75] Inventor: Donald G. Corcoran, Montvale, N.J.

[73] Assignee: International Telephone and Telegraph Corporation, Nutley, N.J.

[22] Filed: July 28, 1975

[21] Appl. No.: 599,807

Related U.S. Application Data

[63] Continuation-in-part of Ser. No. 406,754, Oct. 15, 1973.

[52] U.S. Cl. .......................... 340/324 R; 250/251; 331/DIG. 1; 340/324 M
[51] Int. Cl.² ..................................... G06K 15/18
[58] Field of Search ................. 340/324 R, 324 M; 331/94.5 A; 250/251; 358/3

[56] References Cited

UNITED STATES PATENTS

| | | | |
|---|---|---|---|
| 3,524,011 | 8/1970 | Korpel | 250/199 X |
| 3,569,988 | 3/1971 | Schmidt et al. | 250/199 X |
| 3,614,312 | 10/1971 | Fournier et al. | 250/199 X |
| 3,661,441 | 5/1972 | Uchida et al. | 250/199 X |
| 3,710,279 | 1/1973 | Ashkin | 331/94.5 A |
| 3,829,838 | 8/1974 | Lewis et al. | 445/1 |

OTHER PUBLICATIONS

"Laser Beam Levitates Tiny Glass Spheres," *Laser Sphere*, vol. 1, No. 19, Nov. 15, 1971.
"Optical Levitation is Achieved with a Laser Beam," *Optical Spectra*, p. 18, Dec. 1971.

*Primary Examiner*—David L. Trafton
*Attorney, Agent, or Firm*—John T. O'Halloran; Alfred C. Hill

[57] ABSTRACT

There is disclosed herein a 3-D visual display arrangement having a laser to produce a laser beam. This laser beam is intensity modulated either electro-optically or acoustic-optically by Z-coordinate information. The modulated laser beam is deflected electro-optically, acoustic-optically or by mechanically moved mirrors by the X and Y-coordinate control information. After deflection the laser beam is directed to a reference member supporting a plurality of particles, such as, glass spheres, which are levitated (raised from the surface of the reference member and supported and held in space above the reference member) by the laser beam to provide a real 3-D display of the X, Y and Z-coordinate information.

28 Claims, 1 Drawing Figure

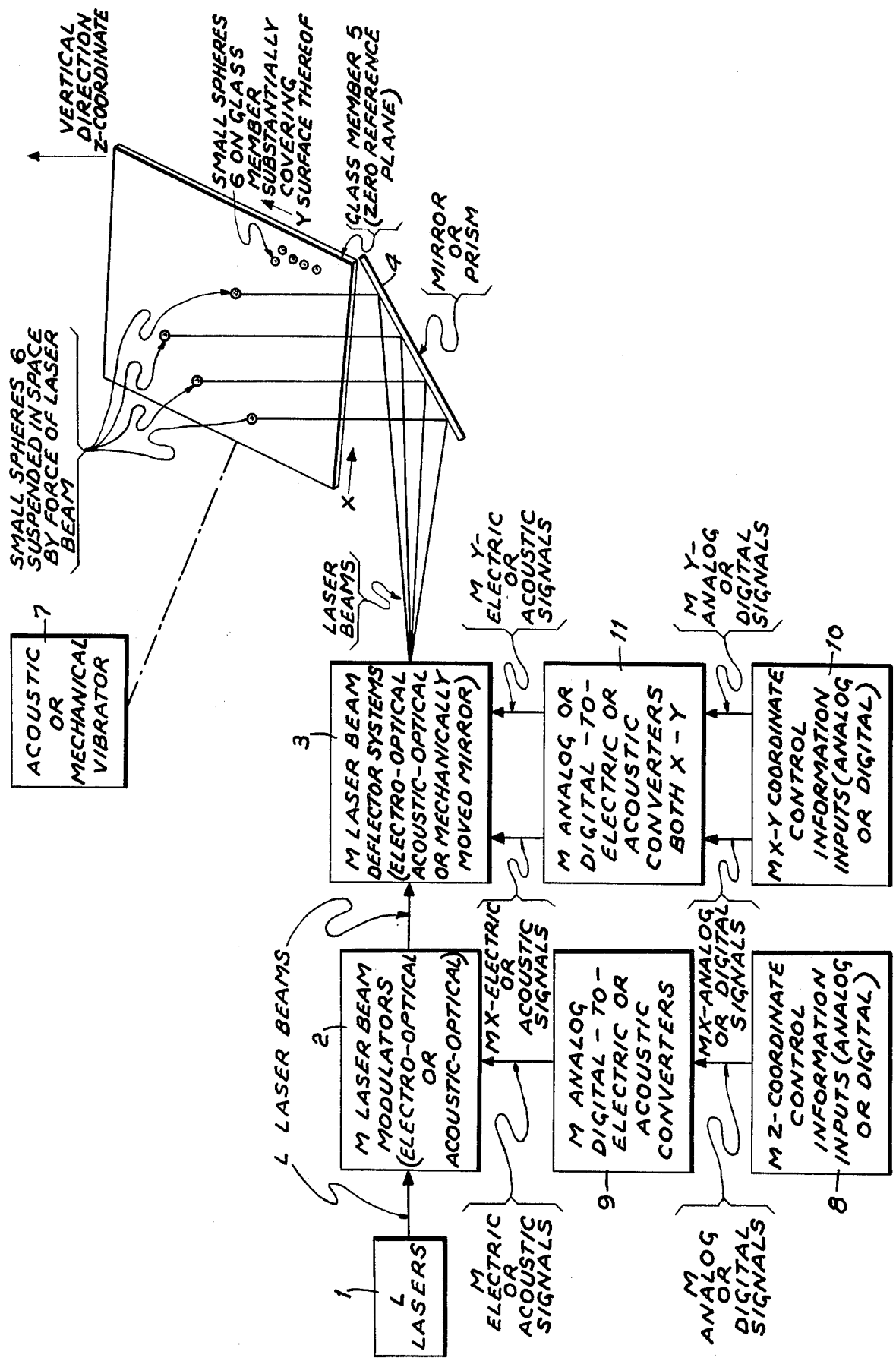

REAL THREE-DIMENSION VISUAL DISPLAY ARRANGEMENT

CROSS-REFERENCE TO RELATED APPLICATIONS

This is a continuation-in-part application of copending application Ser. No. 406,754, filed Oct. 15, 1973.

BACKGROUND OF THE INVENTION

This invention relates to visual display arrangements and more particularly to a three-dimensional (3-D) visual display arrangement.

There are many different types of 3-D visual display arrangements on the market which in the true sense of the word are not "real" 3-D visual display arrangements, since actually without viewing aids, such as, 3-D glasses, the visual display is a two-dimensional display.

Levitation as defined in Webster's Dictionary is "the phenomena or illusion of moving heavy objects, such as the human body, in the air without support." Levitation has in the past been considered an art practiced only by mystics and magicians. However, a recent announcement in the following articles (1) "Optical Levitation Achieved With a Laser Beam", Optical Spectra, Dec. 1971, page 18 and (2) "Laser Beam Levitates Tiny Glass Spheres", Laser Sphere, Nov. 1971, report that scientists at Bell Telephone Laboratories has caused levitation to take on a new dimension. This new dimension is the ability of a laser beam to levitate a particle from a reference plane and to cause this particle to remain suspended visibly unsupported. This phenomena will be referred to herein as "optical levitation".

Optical levitation is based on the principle that the laser beam exerts a radiation pressure on an object such that the object can be raised off a glass reference surface and held aloft for hours in a stable position by a laser beam. The object so levitated may be a small transparent glass sphere. The radiation pressure from the laser beam not only counteracts gravity and raises the particle, but also traps the particle in the beam and prevents it from slipping out of the beam sideways. The beam in effect creates an optical bottle.

SUMMARY OF THE INVENTION

An object of the present invention is to provide a real 3-D visual display arrangement employing optical levitation.

Another object of the present invention is to provide a real three-dimensional visual display of high resolution and brightness and which also possesses the capability of color discrimination utilizing the principles of optical levitation.

A feature of the present invention is the provision of a real three-dimensional visual display arrangement comprising: L lasers to produce L laser beams, where L is an integer including one; M first sources of Z-coordinate information to be displayed, where M is an integer including one which may be equal to or different than L; M second sources of X and Y-coordinate information to be displayed; M first means coupled to the first sources and in an operative relation with the laser beams at the output of the lasers to intensity modulate the laser beams in accordance with the Z-coordinate information; M second means coupled to the second sources and in an operative relation with the laser beams at the output of the first means to deflect the laser beams in accordance with the X and Y-coordinate information; a third means transparent to the laser beams in the path of the laser beams at the output of the second means; and a plurality of small particles supported by the third means prior to the laser beams at the output of the second means passing through the third means, certain ones of the plurality of small particles be raised from the third means by the laser beams at the output of the second means and suspended and held in space above the third means by the laser beams at the output of the second means to provide a real three-dimensional display of the X, Y and Z-coordinate information.

BRIEF DESCRIPTION OF THE DRAWING

Above-mentioned and other features and objects of this invention will become more apparent by reference to the following description taken in conjunction with the accompanying drawing, the sole Figure of which is a schematic block diagram of a real 3-D visual display arrangement in accordance with the principles of the present invention.

DESCRIPTION OF THE PREFERRED EMBODIMENTS

To facilitate the following description the prefixes L and M in the legends of the various blocks and attached to the various lead lines will both be assumed to be equal to one. However, as will be pointed out hereinbelow L and M can be any integer including one and the value of M may be equal to or different than the value of L.

The basic components of the 3-D visual display arrangement of the present invention includes laser 1. Laser 1 projects the laser beam to laser beam modulator 2 wherein the laser beam is intensity modulated by Z-coordinate control information. The intensity modulated output laser beam of modulator 2 is then deflected by laser beam deflection system 3 which is controlled by X and Y-coordinate control information. The thusly deflected intensity modulated laser beam is directed to a mirror or prism 4 which is employed to direct the intensity modulated deflected laser beam to a zero reference plane in the form of member 5 which is composed of a material transparent to the laser beam, such as glass. On the upper surface of member 5 are disposed small transparent glass beads or spheres having a diameter of 0.001 of an inch which may be colored to effect better display discrimination. These spheres or beads 6 are disposed to substantially cover the entire upper surface of member 5 and may be held thereon and located in their rest or non-levitated position by tiny depressions (not shown) in the upper surface of member 5. When a laser beam passes through member 5 and vibrator 7, which may be mechanical or acoustic in nature, vibrates or agitates member 5 to break the Vander Waal's attraction force between spheres 6 and member 5, one of the spheres 6 will be raised from the surface of member 5 and entrapped in the laser beam to a height determined by and proportional to the Z-coordinate control information which has intensity modulated the laser beam. The position of the sphere 6 in the X-Y plane raised by the intensity of the laser beam is determined by the X and Y-coordinate control information.

Laser 1 is constructed to have an output aperture of sufficient diameter to produce a pencil beam having a 0.005 of an inch diameter when directed onto spheres 6 having a diameter of 0.001 of an inch in the example employed herein. The laser beam will be dispersing at its point of contact with sphere 6 which will assist in levitation, Z coordinate stability and X-Y coordinate stability. The diameter of sphere 6 and the laser beam may of course be changed provided there is sufficient beam power to overcome the force of gravity operating on sphere 6. However, the beam diameter and sphere 6 diameter should have the same relative order of magnitude as employed in the present example. Laser beams operating in the $TEM_{00}$ mode by their very nature are gausian, i.e., they are most intense in the center and tend to decrease in intensity away from the center in accordance with a bell-shaped intensity gradient. All that is necessary to levitate sphere 6 once it is air-borne is sufficient beam intensity to counteract gravity and, therefore, the height of sphere 6 trapped in and levitated by the laser beam is proportional to beam intensity which in turn is dependent on the Z-coordinate control information. Due to the relative diameter of sphere 6 and the cross-sectional region of the laser beam, X, Y positional stability is provided for a levitated sphere 6.

Laser beams can be constructed to operate in another mode, namely, the $TEM_{10}$ mode, which has a doughnut shaped intensity gradient with the highest intensity occurring adjacent the edge of the laser beam with the lowest intensity occurring in the center of the laser beam. Thus, once the sphere 6 is levitated and is held by the laser beam at a height proportional to the Z-coordinate control information, the doughnut shaped intensity gradient will provide X, Y positional stability.

Due to the intensity, gradient, in the cross-section of the laser beam in either of the above modes of operation of laser 1, sphere 6 seeks the center of the beam and is there by the centering radiation forces. Similarly due to the vertical intensity gradient corresponding to the angle of beam divergence (or convergence), the sphere seeks a vertical position on or along the center line of the beam at the point where the vertical radiation force equals the gravitational force on the sphere. The vertical radiation force is proportional to the Z-coordinate control information. To influence the beam expansion (or convergence) and hence, influence the vertical force gradient along the beam, the beam itself may be made either more or less divergent or convergent, or the beam shaped by optical means.

As illustrated in the FIG. the Z-coordinate control information is applied to input 8 and may be either analog or digital in nature. The analog or digital signal carrying the Z-coordinate control information is applied to analog or digital-to-electric or acoustic converter 9 to provide an electric signal (voltage) or an acoustic signal having an amplitude proportional to the Z-coordinate control information to intensity modulate the laser beam in modulator 2. Modulator 2 may be an electro-optical modulator and under this condition converter 9 will produce a voltage having an amplitude proportional to the Z-coordinate control information. Modulator 2 may also be an acoustic-optical modulator and under this condition converter 9 will produce an acoustic signal having an amplitude proportional to the Z-coordinate control information.

When the Z-coordinate control information is analog in nature, converter 9 will be an analog signal-to-an electric signal (voltage) converter which may take the form of a capacitor circuit to produce a voltage having an amplitude which is proportional to the Z-coordinate control information for operation of an electro-optical modulator employed as modulator 2. If modulator 2 should be an acoustic-optical modulator, converter 9 could include the same capacitor circuit with the attention of an acoustic signal generator controlled by the capacitor circuit voltage to produce an amplitude modulated acoustic signal to control the acoustic-optical modulator employed in modulator 2.

When the Z-coordinate control information at input 8 is digital in nature, converter 9 must first convert the digital signal to an analog signal by means of a digital-to-analog converter. The resultant analog signal will then be operated upon by the above-mentioned capacitor circuit to produce a voltage having an amplitude proportional to the Z-coordinate control information to control modulator 2 in the form of an electro-optical modulator. When modulator 2 is an acoustic-optical modulator the capacitor circuit voltage will amplitude modulate an acoustic signal as described hereinabove.

The X and Y-coordinate control information is supplied at input 10 which will have two outputs, one for the X-coordinate control information and one for the Y-coordinate control information. These information signals would then be coupled to converter 11 which may take the same form as converter 9 described hereinabove, but will differ from converter 9 in that a converter arrangement is provided for each of the X and Y-coordinate control information signals. The X and Y-coordinate output signals, either a voltage or an amplitude modulated acoustic signal will then be applied to deflection system 3. When a voltage is at the outputs of converter 11, system 3 will be an electro-optical deflection system or a deflecting mirror arrangement driven by two motors to tilt the deflecting mirror on its X and Y axes in accordance with the X and Y-coordinate voltages. When an acoustic signal is present at the output of converters 11 an acoustic-optical deflection system will be employed for deflection system 3.

When the mechanically moved mirror deflection system is employed for deflection system 3, it is then possible to eliminate mirror or prism 4, since the deflection mirror can be positioned to deflect the laser beam directly through member 5 to levitate spheres 6 in accordance with the X, Y and Z-coordinate information.

The real 3-D display arrangement of this invention provides a 3-D display by employing small glass spheres or particles approximately 0.001 of an inch in diameter which are suspended and held in space (gas, air or vacuum) by the forces of a laser beam or beams of approximately 0.005 of an inch in diameter. The position of the glass spheres or particles is controlled by the beam numbers and intensities which in turn are controlled by electro-optical or acoustic-optical intensity modulators and electro-optical, acoustic-optical or mechanically moved mirror deflection system. The digital or analog X, Y and Z-coordinate information is converted into correspondingly proportional electric or acoustic signals which control the appropriate laser modulator and deflection systems.

One possible implementation of the laser modulator and deflection systems is fully disclosed in U.S. Pat. No. 3,314,074, issued Apr. 11, 1967, whose disclosure is incorporated herein by reference. An alternative possible implementation of the laser modulator and deflection systems is fully disclosed in U.S. Pat. No.

3,448,458, issued June 3, 1969 whose disclosure is incorporated herein by reference.

An alternative implementation for modulator 2 is the employment of a lens that is moved along the beam path by a mechanical arrangement responsive to the Z-coordinate control information to intensity modulate the laser beam. The moving or shifting of the focus point merely changes the position of greatest energy density or intensity. The particle or sphere 6 seeks out the point of greatest density which just balances the gravitational forces. It should be pointed out, however, that focusing of the laser beam, per se, is not an essential requirement to achieve levitation of sphere 6. All that is necessary to levitate the particle or sphere 6 once it is air-born is the proper relative diameters of the laser beam and sphere 6 and a sufficient beam intensity to counteract gravity.

Modulator 2 and deflection system 3 may modulate and deflect only one laser beam when only one laser 1 is employed. However, more than one laser 1 may be employed. In this case modulator 2 and deflection system 3 may simultaneously modulate and deflect the plurality of laser beams produced by the plurality of lasers 1 and, thus, more than one laser beam may be directed onto a single sphere or particle. In the case of a plurality of lasers 1 it is also possible to have a number of modulators 2 and deflection systems 3 together with their controlling coordinate control information equal to the number of lasers 1 so that the plurality of laser beams are independently modulated and deflected with each of the plurality of laser beams being directed onto a different one of a plurality of spheres 6. It is for this reason that the prefix L and M are employed in connection with the various blocks and signal paths of the block diagram of the FIG., where L and M are integers including one and may be equal to each other or different than each other depending upon the application in which the display arrangement is employed.

Mirror deflections system may be used in place of the electro-optical or acoustic-optical deflections system as mentioned above or the mirror deflection system may be used in conjunction with these other types of beam deflection systems.

The sizes, colors, transparency and material of the particles are selected to be compatible with the size and intensity of the laser beam or beams.

The effect observed above member 5 is a small bright spot or object suspended in spatial relationship to horizontal and vertical reference planes. This is a truly 3-D display.

One application of the arrangement described herein is the display of planetary systems, for instance, the solar system. The arrangement may also be used for spatial navigation displays, to display the relative positions and movements of space vehicles (aircraft, missiles and spacecraft) with respect to each other and/or with respect to the planets, for instance, the Earth or with respect to the natural satellites of such planets, for instance, the Earth's moon. In addition, the display arrangement of the present invention is applicable to heart research, air traffic control and radar as well as many other applications which presently employ the 3-D visual display arrangements known in the prior art.

While I have described above the principles of my invention in connection with specific apparatus it is to be clearly understood that this description is made only by way of example and not as a limitation to the scope of my invention as set forth in the objects thereof and in the accompanying claims.

I claim:
1. A real three-dimensional visual display arrangement comprising:
   L lasers to produce L laser beams, where L is an integer greater than one;
   M first source of Z-coordinate information to be displayed, where M is an integer equal to L;
   M second sources of X and Y-coordinate information to be displayed;
   M first means each coupled to a different one of said first sources and in an operative relation with a different one of said laser beams at the output of said lasers to intensity modulate each of said laser beams in accordance with an associated one of said Z-coordinate information;
   M second means each coupled to a different one of said second sources and in an operative relation with a different one of said laser beams at the output of said first means to deflect each of said laser beams in accordance with an associated one of said X and Y-coordinate information;
   a third means transparent to said laser beams in the path of said laser beams at the output of said second means; and
   a plurality of small particles supported by said third means prior to said laser beams at the output of said second means passing through said third means, certain ones of said plurality of small particles being raised from said third means by said laser beams at the output of said second means and suspended and held in space above said third means by said laser beams at the output of said second means to provide a real three-dimensional display of said X, Y and Z-coordinate information.
2. An arrangement according to claim 1, wherein said plurality of small particles are small spheres.
3. An arrangement according to claim 2, wherein said small spheres are small glass spheres each having a diameter of approximately 0.001 of an inch; and each of said laser beams have a diameter of approximately 0.005 of an inch.
4. An arrangement according to claim 3, wherein said small glass spheres are appropriately colored to effect a better display discrimination.
5. An arrangement according to claim 4, wherein said third means is a glass member.
6. An arrangement according to claim 5, further including
   fourth means in an operative relation with said glass member to vibrate said glass member.
7. An arrangement according to claim 6, wherein said fourth means includes
   a mechanical vibrator.
8. An arrangement according to claim 6, wherein said fourth means includes
   an acoustic vibrator.
9. An arrangement according to claim 6, wherein each of said first sources includes
   a first input for said Z-coordinate information in analog form, and
   a first converter means to produce a first voltage proportional to said analog Z-coordinate information;
   each of said first means includes an electro-optical modulator coupled to said first converter means to intensity modulate said laser beams in response to said first voltage;

each of said second sources includes
  a second input for said X and Y-coordinate information in analog form, and
  a second converter means to produce a second voltage proportional to said analog X-coordinate information and a third voltage proportional to said analog Y-coordinate information; and each of said second means includes
  an electro-optical deflection system coupled to said second converter means to deflect said laser beams in response to said second and third voltages.

10. An arrangement according to claim 6, wherein
each of said first sources includes
  a first input for said Z-coordinate information in analog form, and
  a first converter means to produce a voltage proportional to said analog Z-coordinate information;

each of said first means includes
  an electro-optical modulator coupled to said first converter means to intensity modulate said laser beams in response to said voltage;

each of said second sources includes
  a second input for said X and Y-coordinate information in analog form, and
  a second converter means to produce a first acoustic signal proportional to said analog X-coordinate information and a second acoustic signal proportional to said analog Y-coordinate information; and each of said second means includes
  an acoustic-optical deflection system coupled to said second converter means to deflect said laser beams in response to said first and second acoustic signals.

11. An arrangement according to claim 6, wherein
each of said first sources includes
  a first input for said Z-coordinate information in analog form, and
  a first converter means to produce an acoustic signal proportional to said analog Z-coordinate information;

each of said first means includes
  an acoustic-optical modulator coupled to said first converter means to intensity modulate said laser beams in response to said acoustic signal;

each of said second sources includes
  a second input for said X and Y-coordinate information in analog form, and
  a second converter means to produce a first voltage proportional to said analog X-coordinate information and a second voltage proportional to said analog Y-coordinate information; and each of said second means includes
  an electro-optical deflection system coupled to said second converter means to deflect said laser beams in response to said first and second voltage signals.

12. An arrangement according to claim 6, wherein
each of said first sources includes
  a first input for said Z-coordinate information in analog form, and a first converter means to produce a first acoustic signal proportional to said analog Z-coordinate information;

each of said first means includes
  an acoustic-optical modulator coupled to said first converter means to intensity modulate said laser beam in response to said first acoustic signal;

each of said second sources includes
  a second input for said X and Y-coordinate information in analog form, and
  a second converter means to produce a second acoustic signal proportional to said analog X-coordinate information and a third acoustic signal proportional to said analog Y-coordinate information; and each of said second means includes
  an acoustic-optical deflection system coupled to said second converter means to deflect said laser beam in response to said first and second acoustic signals.

13. An arrangement according to claim 6, wherein
each of said first sources includes
  a first input for said Z-coordinate information in analog form, and
  a first converter means to produce a first voltage proportional to said analog Z-coordinate information;

each of said first means includes
  an electro-optical modulator coupled to said first converter means to intensity modulate said laser beams in response to said first voltage;

each of said second sources includes
  a second input for said X and Y-coordinate information in digital form, and
  a second converter means to produce a second voltage proportional to said digital X-coordinate information and a third voltage proportional to said digital Y-coordinate information; and each of said second means includes
  an electro-optical deflection system coupled to said second converter means to deflect said laser beams in response to said second and third voltages.

14. An arrangement according to claim 6, wherein
each of said first sources includes
  a first input for said Z-coordinate information in analog form, and
  a first converter means to produce a voltage proportional to said analog Z-coordinate information;

each of said first means includes
  an electro-optical modulator coupled to said first converter means to intensity modulate said laser beams in response to said voltage;

each of said second sources includes
  a second input for said X and Y-coordinate information in digital form, and
  a second converter means to produce a first acoustic signal proportional to said digital X-coordinate information and a second acoustic signal proportional to said digital Y-coordinate information; and each of said second means includes
  an acoustic-optical deflection system coupled to said second converter means to deflect said laser beams in response to said first and second acoustic signals.

15. An arrangement according to claim 6, wherein each of said first sources includes
  a first input for said Z-coordinate information in analog form, and
  a first converter means to produce an acoustic signal proportional to said analog Z-coordinate information;
each of said first means includes
  an acoustic-optical modulator coupled to said first converter means to intensity modulate said laser beams in response to said acoustic signal;
each of said second sources includes
  a second input for said X and Y-coordinate information in digital form, and
  a second converter means to produce a first voltage proportional to said digital X-coordinate information and a second voltage proportional to said digital Y-coordinate information; and
each of said second means includes
  an electro-optical deflection system coupled to said second converter means to deflect said laser beams in response to said first and second voltage signals.

16. An arrangement according to claim 6, wherein
each of said first sources includes
  a first input for said Z-coordinate information in analog form, and
  a first converter means to produce a first acoustic signal proportional to said analog Z-coordinate information;
each of said first means includes
  an acoustic-optical modulator coupled to said first converter means to intensity modulate said laser beam in response to said first acoustic signal;
each of said second sources includes
  a second input for said X and Y-coordinate information in digital form, and
  a second converter means to produce a second acoustic signal proportional to said digital X-coordinate information and a third acoustic signal proportional to said digital Y-coordinate information; and
each of said second means includes
  an acoustic-optical deflection system coupled to said second converter means to deflect said laser beam in response to said first and second acoustic signals.

17. An arrangement according to claim 6, wherein
each of said first sources includes
  a first input for said Z-coordinate information in digital form, and
  a first converter means to produce a first voltage proportional to said digital Z-coordinate information;
each of said first means includes
  an electro-optical modulator coupled to said first converter means to intensity modulate said laser beams in response to said first voltage;
each of said second sources includes
  a second input for said X and Y-coordinate information in analog form, and
  a second converter means to produce a second voltage proportional to said analog X-coordinate information and a third voltage proportional to said analog Y-coordinate information; and
each of said second means includes
  an electro-optical deflection system coupled to said second converter means to deflect said laser beams in response to said second and third voltages.

18. An arrangement according to claim 6, wherein
each of said first sources includes
  a first input for said Z-coordinate information in digital form, and
  a first converter means to produce a voltage proportional to said digital Z-coordinate information;
each of said first means includes
  an electro-optical modulator coupled to said first converter means to intensity modulate said laser beams in response to said voltage;
each of said second sources includes
  a second input for said X and Y-coordinate information in analog form, and
  a second converter means to produce a first acoustic signal proportional to said analog X-coordinate information and a second acoustic signal proportional to said analog Y-coordinate information; and
each of said second means includes
  an acoustic-optical deflection system coupled to said second converter means to deflect said laser beams in response to said first and second acoustic signals.

19. An arrangement according to claim 6, wherein
each of said first sources includes
  a first input for said Z-coordinate information in digital form, and
  a first converter means to produce an acoustic signal proportional to said digital Z-coordinate information;
each of said first means includes
  an acoustic-optical modulator coupled to said first converter means to intensity modulate said laser beams in response to said acoustic signal;
each of said second sources includes
  a second input for said X and Y-coordinate information in analog form, and
  a second converter means to produce a first voltage proportional to said analog X-coordinate information an a second voltage proportional to said analog Y-coordinate information; and
each of said second means includes
  an electro-optical deflection system coupled to said second converter means to deflect said laser beams in response to said first and second voltage signals.

20. An arrangement according to claim 6, wherein
each of said first sources includes
  a first input for said Z-coordinate information in digital form, and
  a first converter means to produce a first acoustic signal proportional to said digital Z-coordinate information;
each of said first means includes
  an acoustic-optical modulator coupled to said first converter means to intensity modulate said laser beam in response to said first acoustic signal;
each of said second sources includes
  a second input for said X and Y-coordinate information in analog form, and
  a second converter means to produce a second acoustic signal proportional to said analog X-coordinate information and a third acoustic signal proportional to said analog Y-coordinate information; and each of said second means includes
an acoustic-optical deflection system coupled to said second converter means to deflect said laser beam in response to said first and second acoustic signals.

21. An arrangement according to claim 6, wherein
each of said first sources includes
a first input for said Z-coordinate information in digital form, and
a first converter means to produce a first voltage proportional to said digital Z-coordinate information;
each of said first means includes
an electro-optical modulator coupled to said first converter means to intensity modulate said laser beams in response to said first voltage;
each of said second sources includes
a second input for said X and Y-coordinate information in digital form, and
a second converter means to produce a second voltage proportional to said digital X-coordinate information and a third voltage proportional to said digital Y-coordinate information; and
each of said second means includes
an electro-optical deflection system coupled to said second converter means to deflect said laser beams in response to said second and third voltages.

22. An arrangement according to claim 6, wherein
each of said first sources includes
a first input for said Z-coordinate information in digital form, and
a first converter means to produce a voltage proportional to said digital Z-coordinate information;
each of said first means includes
an electro-optical modulator coupled to said first converter means to intensity modulate said laser beams in response to said voltage;
each of said second sources includes
a second input for said X and Y-coordinate information in digital form, and
a second converter means to produce a first acoustic signal proportional to said digital X-coordinate information and a second acoustic signal proportional to said digital Y-coordinate information; and
each of said second means includes
an acoustic-optical deflection system coupled to said second converter means to deflect said laser beams in response to said first and second acoustic signals.

23. An arrangement according to claim 6, wherein
each of said first sources includes
a first input for said Z-coordinate information in digital form, and
a first converter means to produce an acoustic signal proportional to said digital Z-coordinate information;
each of said first means includes
an acoustic-optical modulator coupled to said first converter means to intensity modulate said laser beams in response to said acoustic signal;
each of said second sources includes
a second input for said X and Y-coordinate information in digital form, and
a second converter means to produce a first voltage proportional to said digital X-coordinate information and a second voltage proportional to said digital Y-coordinate information; and
each of said second means includes
an electro-optical deflection system coupled to said second converter means to deflect said laser beams in response to said first and second voltage signals.

24. An arrangement according to claim 6, wherein
each of said first sources includes
a first input for said Z-coordinate information in digital form, and
a first converter means to produce a first acoustic signal proportional to said digital Z-coordinate information;
each of said first means includes
an acoustic-optical modulator coupled to said first converter means to intensity modulate said laser beam in response to said first acoustic signal;
each of said second sources includes
a second input for said X and Y-coordinate information in digital form, and
a second converter means to produce a second acoustic signal proportional to said digital X-coordinate information and a third acoustic signal proportional to said digital Y-coordinate information; and
each of said second means includes
an acoustic-optical deflection system coupled to said second converter means to deflect said laser beam in response to said first and second acoustic signals.

25. An arrangement according to claim 6, wherein
each of said first sources includes
a first input for said Z-coordinate information in analog form, and
a first converter means to produce a first voltage proportional to said analog Z-coordinate information;
each of said first means includes
an electro-optical modulator coupled to said first converter means to intensity modulate said laser beams in response to said first voltage;
each of said second sources includes
a second input for said X and Y-coordinate information in analog form, and
a second converter means to produce a second voltage proportional to said analog X-coordinate information and a third voltage proportional to said analog Y-coordinate information; and
each of said second means includes
a mechanically moved mirror deflection system coupled to said second converter means to deflect said laser beams in response to said second and third voltages.

26. An arrangement according to claim 6, wherein
each of said first sources includes
a first input for said Z-coordinate information in analog form, and
a first converter means to produce an acoustic signal proportional to said analog Z-coordinate information;
each of said first means includes
an acoustic-optical modulator coupled to said first converter means to intensity modulate said laser beams in response to said acoustic signal;
each of said second sources includes
a second input for said X and Y-coordinate information in analog form, and a second converter means to produce a first voltage proportional to said analog X-coordinate information and a second voltage proportional to said analog Y-coordinate information; and each of said second means includes
a mechanically moved mirror deflection system coupled to said second converter means to deflect said laser beams in response to said first and second voltage signals.

27. An arrangement according to claim 6, further including
a mirror disposed at a given angle in the path of said laser beams between said second means and said third means.

28. An arrangement according to claim 6, further including
a prism disposed at a given angle in the path of said laser beams between said second means and said third means.

* * * * *